US012524587B2

United States Patent
Liu et al.

(10) Patent No.: US 12,524,587 B2
(45) Date of Patent: Jan. 13, 2026

(54) OPTIMIZATION METHOD FOR FUEL CONTROL DEVICE STRUCTURE BASED ON ADDITIVE MANUFACTURING

(71) Applicant: Nanchang Hangkong University, Nanchang (CN)

(72) Inventors: Zheng Liu, Nanchang (CN); Qi Zhang, Nanchang (CN); Mei Li, Nanchang (CN); Mingjie Zhao, Nanchang (CN); Yuhua Chen, Nanchang (CN); Lihong Jiang, Nanchang (CN); Zhenghua Guo, Nanchang (CN); Meng Zhao, Nanchang (CN); Hua Tang, Nanchang (CN); Changmin Luo, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 19/054,951

(22) Filed: Feb. 17, 2025

(65) Prior Publication Data

US 2025/0356081 A1   Nov. 20, 2025

(30) Foreign Application Priority Data

May 15, 2024   (CN) .......................... 202410603116.8

(51) Int. Cl.
*G06F 30/23* (2020.01)
*B33Y 50/00* (2015.01)
(Continued)

(52) U.S. Cl.
CPC .............. *G06F 30/23* (2020.01); *B33Y 50/00* (2014.12); *B33Y 80/00* (2014.12); *G06F 2113/08* (2020.01); *G06F 2113/10* (2020.01)

(58) Field of Classification Search
CPC .......... G06F 30/23; B33Y 50/00; B33Y 80/00
See application file for complete search history.

(56) References Cited

U.S. PATENT DOCUMENTS

2023/0385488 A1   11/2023   Yanshan

FOREIGN PATENT DOCUMENTS

CN         104411951 B   *  10/2018   ................ F01L 1/18
CN         111222232 A       6/2020
(Continued)

OTHER PUBLICATIONS

Liu, H., Li, P., & Wang, K. (2015). The flow downstream of a bifurcation of a flow channel for uniform flow distribution via cascade flow channel bifurcations. Applied Thermal Engineering, 81, 114-127. (Year: 2015).*

(Continued)

*Primary Examiner* — Bijan Mapar
(74) *Attorney, Agent, or Firm* — Addison D. Ault; IPGentleman Intellectual Property Services, LLC

(57) ABSTRACT

An optimization method for a fuel control device structure based on additive manufacturing includes: performing a basic arrangement analysis and a selection of the fuel control device structure; performing an arrangement design of a basic component/interface feature structure according to the basic configuration structure; performing an optimization design for a flow channel structure on the basis of determining structural features of all cores, components and interfaces; performing the optimization design for an outer envelope structure on the basis of the flow channel structure; and checking a calculation and optimizing an iterative design of the fuel control device structure through a finite element tool, and determining a structural scheme of the optimal fuel control device. The optimization method gives full play to the technological advantages of additive manufacturing and determines the optimal structural arrangement and flow channel design scheme to meet the product requirements through pure forward design ideas.

7 Claims, 6 Drawing Sheets

(51) Int. Cl.
    *B33Y 80/00*     (2015.01)
    *G06F 113/08*     (2020.01)
    *G06F 113/10*     (2020.01)

(56) References Cited

FOREIGN PATENT DOCUMENTS

| CN | 114970068 A | 8/2022 |
|----|-------------|--------|
| CN | 116029003 A | 4/2023 |
| WO | 2018045351 A1 | 3/2018 |

OTHER PUBLICATIONS

Zhang, L., Bi, H. T., Wilkinson, D. P., Stumper, J., & Wang, H. (2008). Gas-liquid two-phase flow patterns in parallel channels for fuel cells. Journal of Power Sources, 183(2), 643-650. (Year: 2008).*

Hao, C., Lu, Z., Feng, Y., Bai, H., Wen, M., & Wang, T. (2021). Optimization of fuel/air mixing and combustion process in a heavy-duty diesel engine using fuel split device. Applied Thermal Engineering, 186, 116458. (Year: 2021).*

Agh, S. M., Pirkandi, J., Mahmoodi, M., & Jahromi, M. (2019). Optimum design, simulation and test of a new flow control valve with an electronic actuator for turbine engine fuel control system. Flow Measurement and Instrumentation, 65, 65-77. (Year: 2019).*

Du, Y., et al. (2021). Multi-objective optimization of an innovative power-cooling integrated system based on gas turbine cycle with compressor inlet air precooling, Kalina cycle and ejector refrigeration cycle. Energy Conversion and Management, 244, 114473. (Year: 2021).*

Li, D., Hang, J., Li, Y., & Dong, S. (2021). Fuel flowrate control for aeroengine and fuel thermal management for airborne system of aircraft—An overview. Applied Sciences, 12(1), 279. (Year: 2021).*

Lei Liming, et al., Application and Challenges of Metal Additive Manufacturing in Civil Aviation, Aviation Manufacturing Technology, 2019, pp. 22-30, vol. 62, No. 21.

* cited by examiner

OPTIMIZATION METHOD FOR FUEL CONTROL DEVICE STRUCTURE BASED ON ADDITIVE MANUFACTURING

CROSS REFERENCE TO THE RELATED APPLICATIONS

This application is based upon and claims priority to Chinese Patent Application No. 202410603116.8, filed on May 15, 2024, the entire contents of which are incorporated herein by reference.

TECHNICAL FIELD

The present invention relates to the field of metal additive manufacturing technology, particularly to an optimization method for fuel control device structure based on additive manufacturing.

BACKGROUND

With the continuous improvement of aircraft performance requirements in the aviation field, the overall weight requirements of the aircraft are increasingly stringent, and in order to improve the carrying capacity and dynamic performance of the aircraft, and to reduce the fuel consumption and redundant structural quality at the same time, a large number of components are facing urgent lightweight requirements. As an important component of the airborne fuel system, the fuel control device is required to reduce the structural quality as much as possible, and has good functionality and structural strength, in order to explore the lightweight scheme of the fuel control device, it is necessary to study the lightweight design of the component structure.

Additive manufacturing technology (three-dimensional (3D) printing) is a material processing technology based on the principle of 'dispersed-accumulated', which uses laser and other heat sources to realize the laminated manufacturing of raw materials and finally forms 3D parts. There are many specific technical classifications of additive manufacturing technology, wherein selective laser melting (SLM) is currently the most widely used metal additive manufacturing technology. The technology uses metal powder as raw material and laser as heat source, by reducing the dimension of three-dimensional parts to two-dimensional plane and processing them layer by layer, thereby realizing the forming of complex structural parts, and there is no requirement for mold in the forming process, and the rapid manufacturing of products can be realized.

In the current design stage, the designer should consider not only the necessary functionality and strength requirements, but also the process realization of the parts. Due to the conventional casting and machining process has more constraints on the designer's design, which greatly constrains the design ideas of the designer, and it is difficult to give full play to the limited performance-oriented design thinking of the designer, resulting in the product optimization space is limited, and constrained by the traditional design thinking of valve parts, which makes the development cycle of products longer.

Based on the process of additive manufacturing, this present invention takes the structure of a certain type of fuel control device as the object to study the forward structural design optimization method for the fuel control device based on additive manufacturing, breaking the constraints of traditional design thinking of valve body parts, and product samples can be prepared quickly and iteratively through additive manufacturing technology, which can effectively shorten the development cycle of products.

SUMMARY

An objective of the present invention is to provide an optimization method for fuel control device structure based on additive manufacturing to solve the problems existing in the above background technology.

In order to achieve the above objective, the present invention provides an optimization method for fuel control device structure based on additive manufacturing, including the following steps:

S1, performing a basic arrangement analysis and a selection of the fuel control device structure, and determining different basic configuration structures according to different arrangements of a main core;

S2, performing an arrangement design of a basic component/interface feature structure according to the basic configuration structure, and determining a basic arrangement principle of a module;

S3, performing an optimization design for a flow channel structure on the basis of determining structural features of all cores, components and interfaces; performing a structural optimization design of the single-connected flow channel and the bifurcated flow channel by changing a size of an inlet cross-section of a single-connected flow channel and a size of an outlet cross-section of a bifurcated flow channel;

S4, performing the optimization design for an outer envelope structure on the basis of the flow channel structure; and S5, checking a calculation and optimizing an iterative design of the fuel control device structure through a finite element tool, determining a structural scheme of the optimal fuel control device Preferably, in step S1, the basic configuration structure adopts an L-shaped main core basic configuration and a T-shaped main core basic configuration; in the L-shaped main core basic configuration, fluid flows into three metering valves according to different flow rates through a shape-following bifurcated flow channel, the three metering valves are fan-shaped distribution, three actuating valves and three outlet pipe fittings are axially parallel, and a side of the main core structure is a L-shaped configuration.

Preferably, in the T-shaped main core basic configuration, the fluid is distributed axially into the three flush metering valves through a fluid inlet, the three metering valves are respectively provided with actuating valves perpendicular to the metering valve, and the fluid flows out through three pipe fittings axially parallel to the metering valves, and a side of the whole main core structure is in a side-standing T-shaped configuration.

Preferably, in step S2, a basic arrangement principle includes a preferred arrangement principle for cable-mounted components, a modular arrangement principle for associated components, an arrangement principle for the remaining feature structures in order of size from large to small and a standardized arrangement principle for fine feature structures.

Preferably, the preferred arrangement principle of the cable-mounted components is specified as follows: on the basis of determining the basic configuration of the main core, a position of a wire groove structure is determined by the main core structure, an electro-hydraulic servo valve and a pressure sensor are arranged alternately, and two-by-two groups are distributed according to a shape of a space, and a cable and a pipeline of them are collected into the wire groove structure through a gap between the metering valves, and the two reheat lit solenoid valves are distributed vertically and arranged in parallel, and are connected in a wire collecting groove together with two cable interfaces.

Preferably, the modular arrangement principle for the associated components includes that a reheat lit valve, a layer board and the electro-hydraulic servo valve are associated components to form a modular structure distribution, and the actuating valve, a differential pressure valve and an oil nozzle component also form the modular structure distribution.

Preferably, the arrangement principle for the remaining feature structures in order of size from large to small is that an oil leakage box, a vortex oil filter, the valve, the pipe fitting, the oil nozzle and a measuring point plug screw are arranged in order according to their size.

Preferably, the standardized arrangement principle for fine feature structures is that a screw hole structural feature is arranged according to a same height and a same angle, meanwhile, a structural feature of the measuring point plug screw and a structural arrangements of the reheat lit solenoid valve are designed regularly.

Preferably, in S4, topology optimization is performed on the external structure of the fuel control device after determining a mounting fulcrum position of the fuel control device, and the specific steps are as follows:

step 1, preliminarily designing a design domain range of the fuel control device in the computer-aided design (CAD) modeling software, segmenting a mounting hole position of the mounting fulcrum in the Altair Inspire software, and setting the design domain at the same time;

step 2, applying a fixed constraint condition at the fulcrum position of the fuel control device, applying a pressure load on an inner surface of the flow channel and the pipeline, and at the same time applying an overload load on an X axis, a Y axis and a Z axis respectively;

step 3, setting a quality target and a grid size parameter, and performing a topological calculation on a material distribution of the material in the structural design domain of the fuel control device;

step 4, according to a topological calculation result, performing a reconstruction design on a structure of a mounting fulcrum region of the fuel control device.

Therefore, the present invention adopts an optimization method for fuel control device structure based on additive manufacturing, which has the following beneficial effects:

(1) the weight of the fuel control device is reduced by 38% compared with the original shell;

(2) the metal printing and forming process scheme, post-treatment process scheme and machining process scheme of the fuel control device has been developed;

(3) the relevant design criteria of arrangement design, flow channel design and envelope structure design of complex flow channel products has been put forward;

(4) the design experience and methods are accumulated for the forward lightweight design of related complex flow channel parts, which lays a certain research foundation for the development of typical components based on additive manufacturing.

Further detailed descriptions of the technical scheme of the present invention can be found in the accompanying drawings and embodiments.

DETAILED DESCRIPTION OF THE EMBODIMENTS

Embodiment

Figure 1:
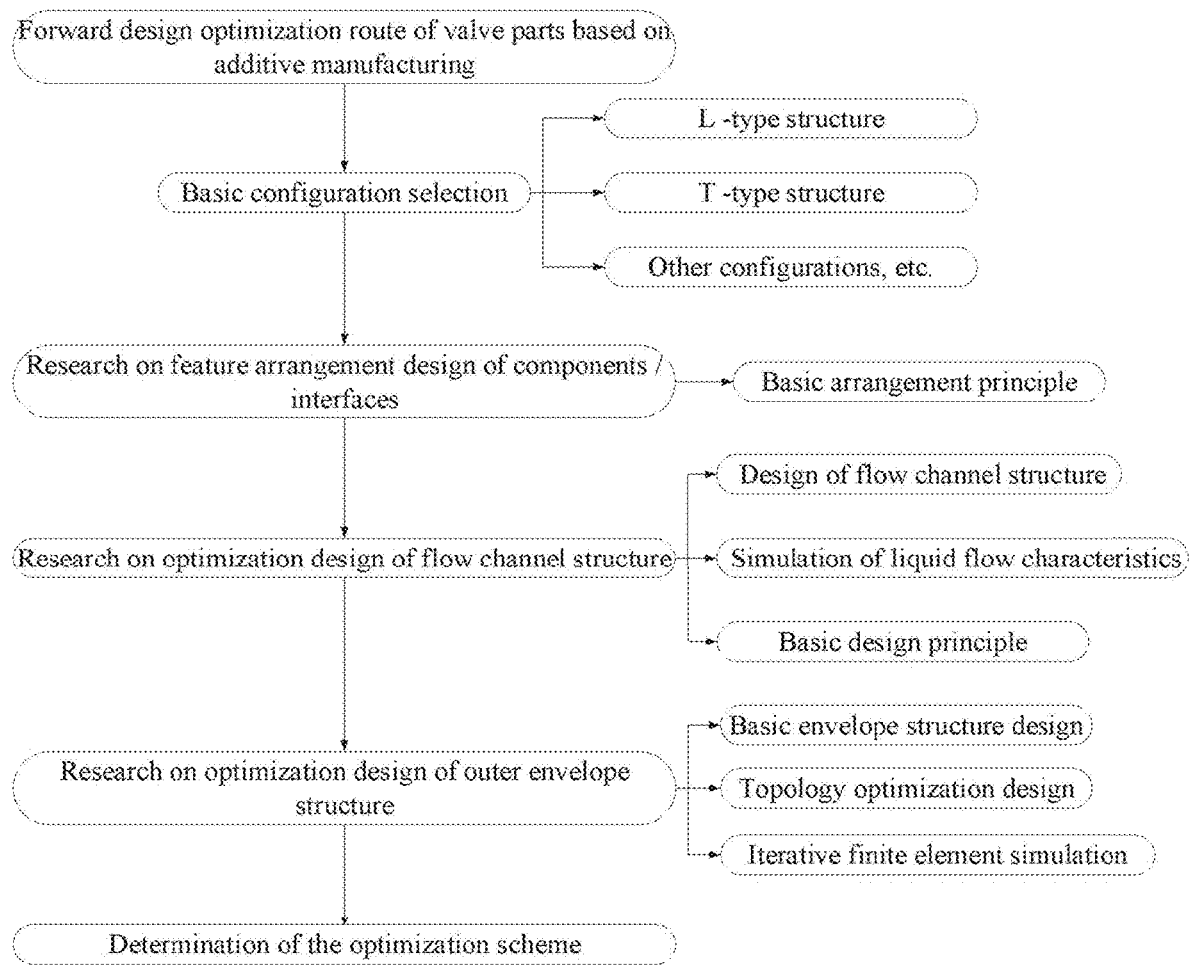
FIG. 1 is a flow diagram of an optimization method for fuel control device structure based on additive manufacturing of the present invention.

In order to make the objectives, the technical solutions, and the advantages of the present invention clearer, the following clearly and completely describes the technical solutions in the drawings of embodiments of the present invention with reference to the embodiments of the present invention. Apparently, the described embodiments are only some but not all of the embodiments of the present invention. The components of the embodiment of the present invention, usually described and illustrated in the accompanying diagram here, can be arranged and designed in a variety of different configurations.

Figure 2:
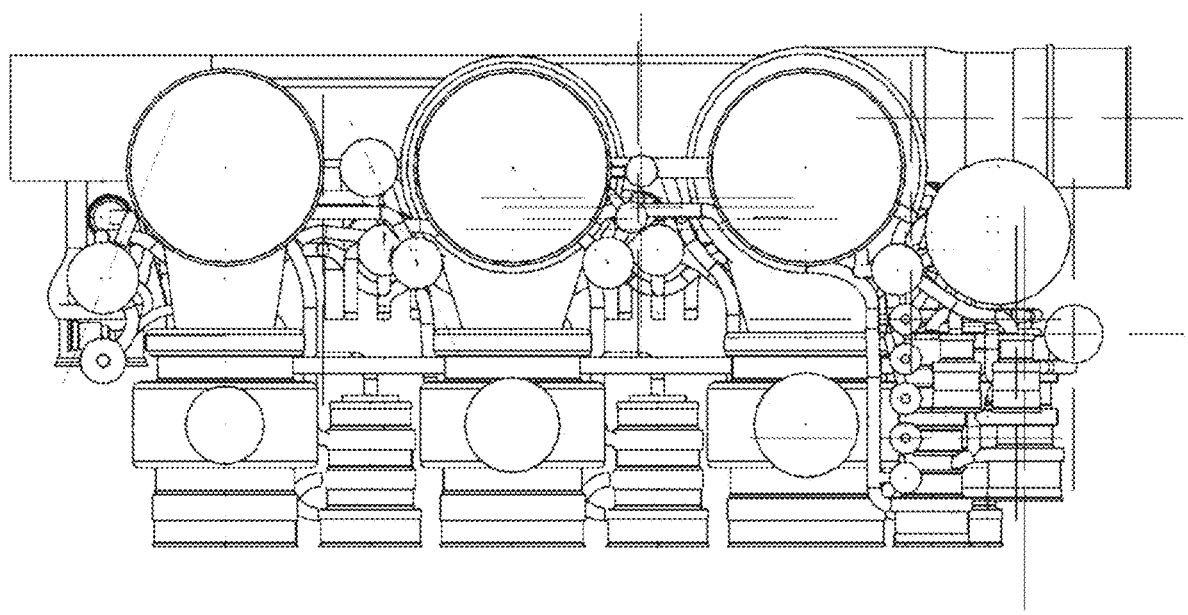
FIG. 2 is a schematic diagram of a structure of a fuel control device before optimization of the present invention.
Figure 3:
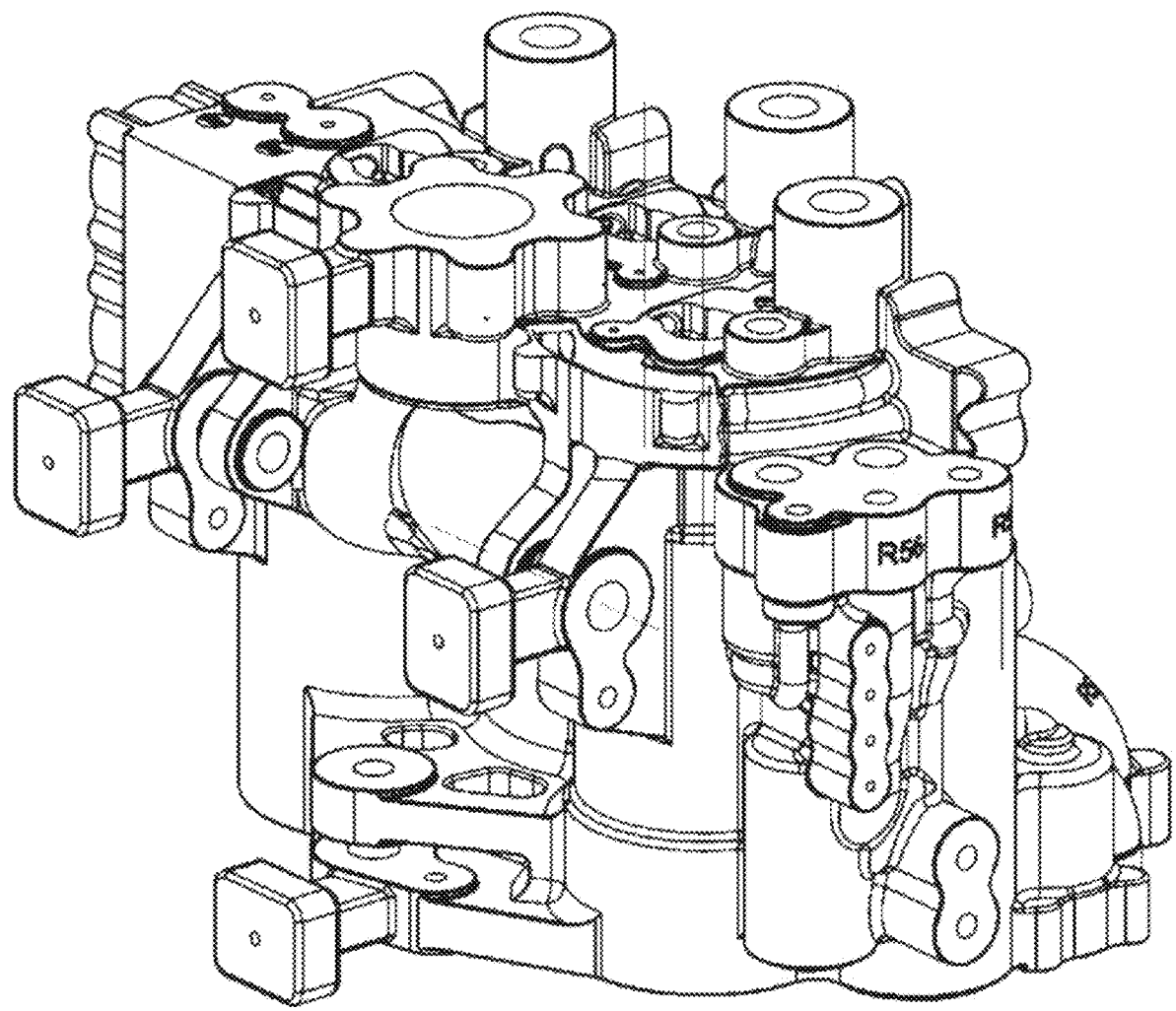
FIG. 3 is a schematic diagram of a structure of a fuel control device after optimization of the present invention.
Figure 4:
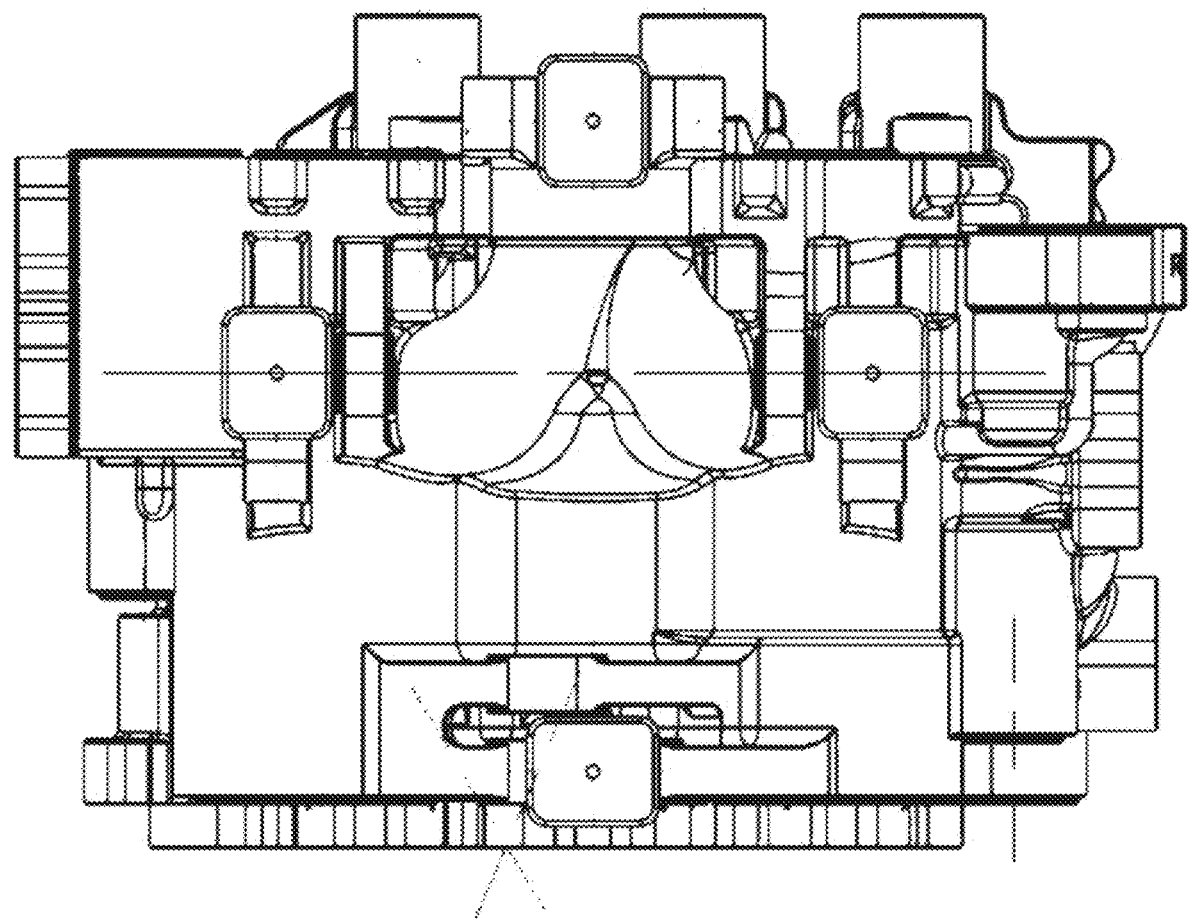
FIG. 4 is a front view of a structure of a fuel control device after optimization of the present invention.
Figure 5:
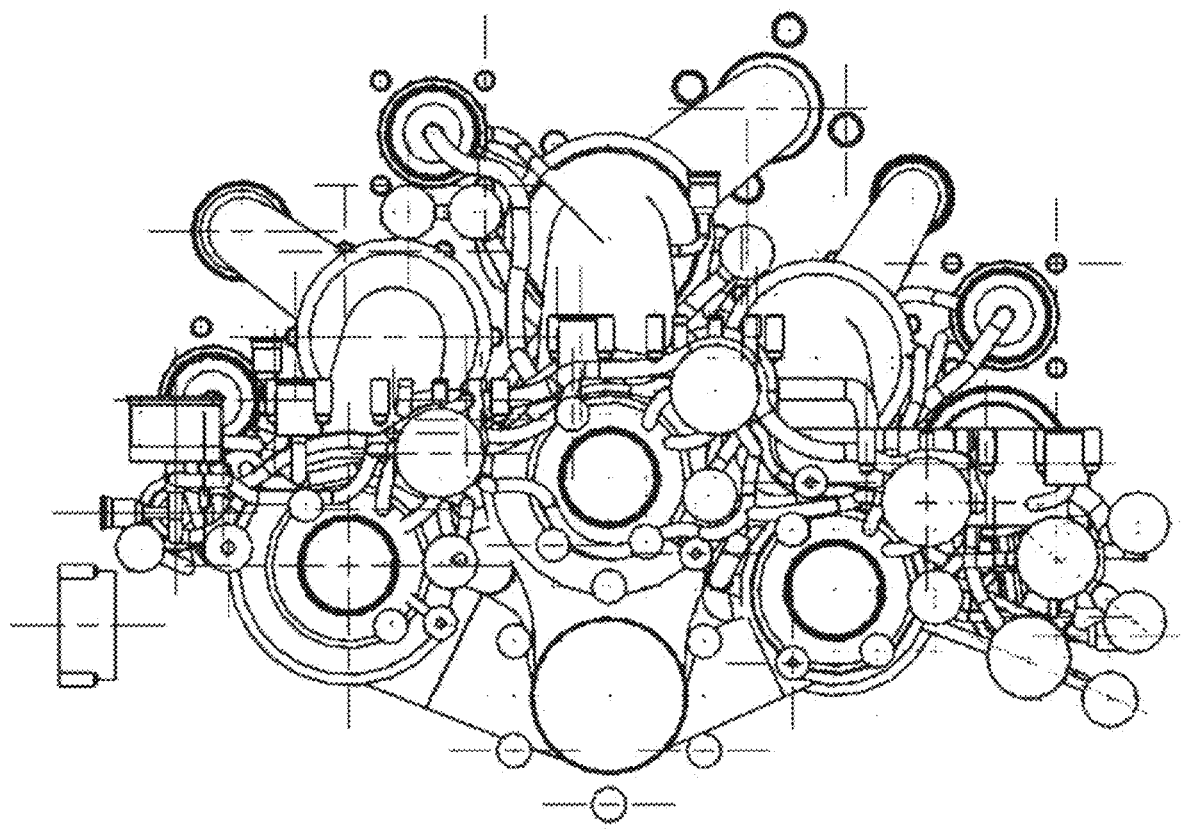
FIG. 5 is a top view of a structure of a fuel control device after optimization of the present invention.
Figure 6:
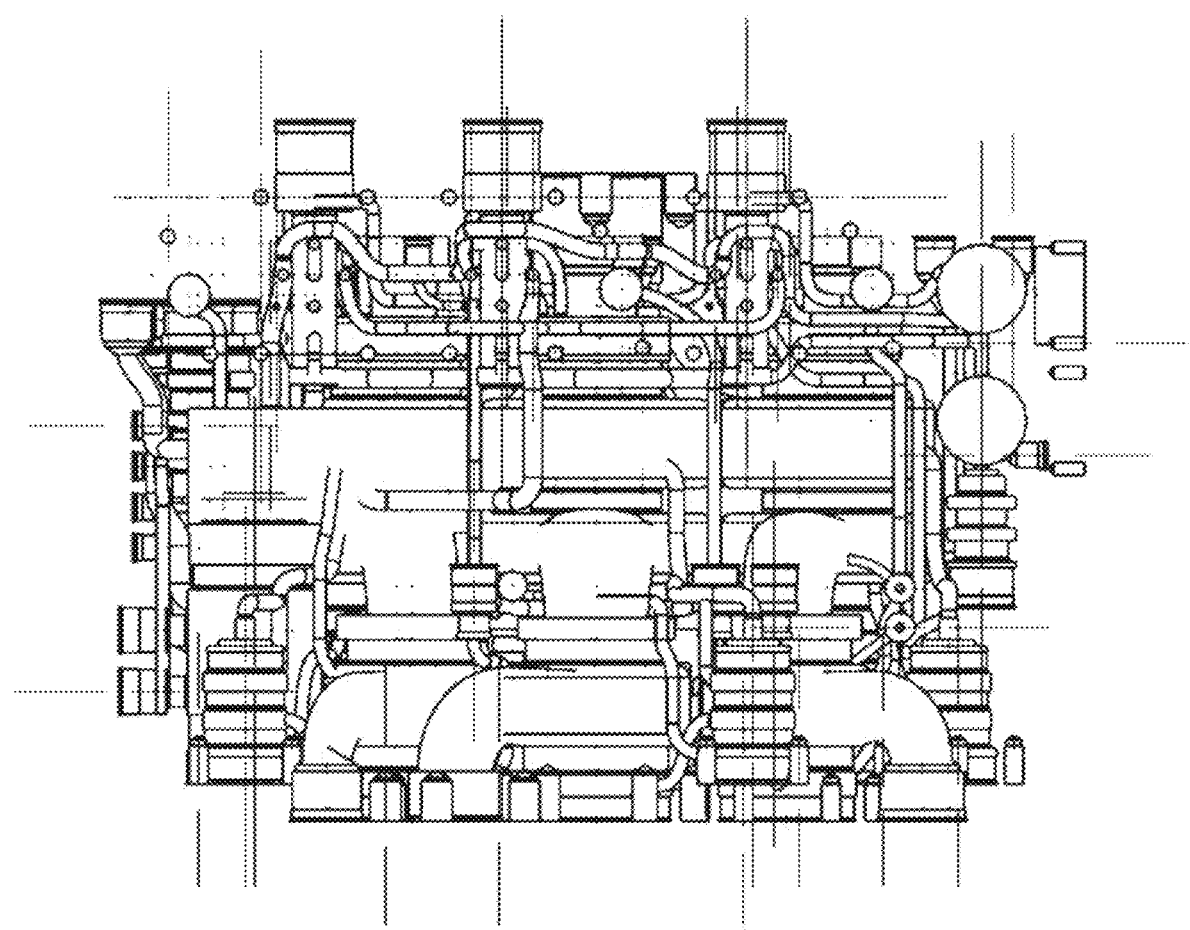
FIG. 6 is a side view of a structure of a fuel control device after optimization of the present invention.

As shown in FIGS. 1-6, an optimization method for fuel control device structure based on additive manufacturing, additive manufacturing technology (3D printing) can realize the processing and manufacturing of parts with high flexibility, but there are also some typical process characteristics (design principles) that need to be followed in the design, the main process constraint characteristics have the following three points:

1. Basic Constraint Problem of Suspended Angle

During the SLM process, the metal powder tends to collapse under the gravity action, meanwhile, the parts are continuously interfered by the reciprocating motion of the scraper during processing. Therefore, parts with too low suspended angle cannot be formed directly in the machining process, and the premise that the relevant features can be formed naturally and have good forming quality is to ensure that the included angle α (suspended angle) between the relevant features and the horizontal plane (base plate) is ≥45° when the parts are placed in the corresponding orientation, otherwise, the support structure needs to be added. If the suspended angle is too low, the forming quality will be significantly affected, and if the suspended angle is located in the internal area of the part, such as the inside of a deep cavity or the space environment is more tortuous and narrow, the added support may not be effectively removed, resulting in the part failing to meet the requirements for use. In order to solve this problem, the key features of the parts can be formed by adjusting the arrangement of the parts or adjusting the internal detail features of the parts.

2. Suspended Problem for Inner Cavity Type Features

As the parts of additive manufacturing are mostly special-shaped structural parts, there are always various kinds of flow channels and cavities in the interior, and the corresponding flow channels and cavities have certain shape and accuracy requirements, so it is necessary for the product designer to consider the form and arrangement of cavity and flow channel at the corresponding position, so as to avoid the existence of a large suspended surface in the inner cavity or flow channel. If there is a large suspended surface for the flow channel structure, the flow channel cross-section can be adjusted by changing the cross-section of the flow channel, and for the adjustment of the cross-section of the suspended inner cavity, the method of adjusting the printing cross-section of the suspended inner cavity can be considered.

3. Powder Cleaning Problem of the Inner Cavity

Since the raw material state of metal additive manufacturing is powder, when the printing process is completed, the unmelted powder will be deposited in the inner cavity of the part, and the residual powder needs to be cleared later. Therefore, the structure of the part cannot have a completely closed cavity during printing the part, if there is a closed cavity in the actual part, a powder leakage hole can be pre-arranged on the part, and mechanical or welding methods are used for plugging after completing the printing and powder cleaning processes.

Including the following steps:

S1, a basic arrangement analysis and a selection of the fuel control device structure are performed based on the product requirements, and different basic configuration structure is determined according to different arrangements of a main core; an L-shaped main core basic configuration, a T-shaped main core basic configuration and an I-type main core basic configuration can be determined according to the different arrangement of the main core, in the L-shaped main core basic configuration, fluid flows into three metering valves according to different flow rates through a shape-following bifurcated flow channel, the three metering valves are fan-shaped distribution, and the three actuating valves and three outlet pipe fittings are axially parallel, and a side of the main core structure is an L-shaped configuration.

In the T-shaped main core basic configuration, the fluid is distributed axially into the three flush metering valves through a fluid inlet, three actuating valves are corresponded and perpendicular to the three metering valves respectively, and the fluid flows out through three pipe fittings axially parallel to the metering valves, and a side of the whole main core structure is in a side-standing T-shaped configuration.

S2, an arrangement design of a basic component/interface feature structure is performed according to the basic configuration structure, and a basic arrangement principle of a common module is determined; including:

1, the preferred arrangement principle of the cable-mounted components is specified as follows: on the basis of determining the basic configuration of the main core, a position of a wire groove structure is determined by the main core structure, an electro-hydraulic servo valve and a pressure sensor are arranged alternately, and two-by-two groups are distributed according to a shape of a space, and a cable and a pipeline of them are collected into the wire groove structure through a gap between the metering valves, and the two reheat lit solenoid valves are distributed vertically and arranged in parallel, and are connected in a wire collecting groove together with two cable interfaces.

2, the modular arrangement principle for the associated components, the associated components mainly refer to the direct connection requirements between two or more components, in the fuel control device, the reheat lit valve, the layer board and the electro-hydraulic servo valve are associated components to form a modular structure distribution, and the actuating valve, a differential pressure valve and an oil nozzle component also form the modular structure distribution.

3, the arrangement principle for the remaining feature structures in order of size from large to small is as follows: the oil leakage box, the vortex oil filter, the valve, the pipe fitting, the oil nozzle and the measuring point plug screw are arranged in order according to their size.

4, the standardized arrangement principle for fine feature structures is specified as follows: the screw hole structural feature is arranged according to the same height and the same angle, meanwhile, a structural feature of the measuring point plug screw and a structural arrangements of the reheat lit solenoid valve are designed regularly, which makes it simple in machining processing, convenient for manual disassembly and assembly, and the overall coordination of the appearance has been improved to a certain extent.

S3, an optimization design for a flow channel structure is performed on the basis of preliminarily determining structural features of all cores, components and interfaces;

(1) optimization design and result analysis of single-connected flow channel by changing the size of the cross-section at the inlet of the single-connected flow channel, the iterative optimization design of the single-connected flow channel is performed, and the velocity streamline diagrams of models 1-4 are obtained, the cross-section of the single-connected flow channel inlet corresponding to models 1-4 decreases in turn, and there is little difference in the flow state and flow trajectory of each single-connected flow channel of different design models.

Table 1 shows the pressure recovery coefficients of the three outlets under different design models, the pressure recovery coefficients of the three outlets under different models are all above 0.98 based on the data, which is mainly due to the smaller total length of the flow channel and the small loss along the way. Meanwhile, the difference in the pressure recovery coefficient of the three outlets under different design models is very small, indicating that the change of the cross-sectional area of the single channel inlet has a very limited effect on the flow channel resistance.

Table 1 Pressure recovery coefficient of single-connected flow channel under different design models

| Model | Pressure recovery coefficient 1 | Pressure recovery coefficient 2 | Pressure recovery coefficient 3 |
| --- | --- | --- | --- |
| 1 | 0.99248 | 0.98513 | 0.98074 |
| 2 | 0.99263 | 0.98505 | 0.98071 |
| 3 | 0.99256 | 0.98494 | 0.98060 |
| 4 | 0.99258 | 0.98467 | 0.98028 |

(2) Optimization Design and Result Analysis of Bifurcated Flow Channel by adjusting the size of the cross-section at the outlet of the bifurcated flow channel, the iterative design of the bifurcated flow channel structure is performed, models 5-6 are set, wherein the cross-sectional area of each outlet of the bifurcated flow channel set by model 5 is larger, the cross-sectional area of each outlet of the flow channel set by model 6 is similar to its outlet flow ratio, and the velocity streamline diagrams under two different design models are obtained, and it can be seen from the comparison that there is less backflow in the bifurcated flow channel structure region in model 6, while there is a large backflow phenomenon in the flow field in this region in model 5; Table 2 is the pressure recovery coefficient of the three outlets of model 5 and model 6, it can be seen that the pressure recovery coefficient of the three outlets of the two models is not much different, the backflow of model 6 is less based on the above analysis, so the model 6 is selected for the bifurcation flow channel design.

Table 2 Pressure recovery coefficient of bifurcation flow channel under different design models

| Model | Pressure recovery coefficient 1 | Pressure recovery coefficient 2 | Pressure recovery coefficient 3 |
|---|---|---|---|
| 5 | 0.99253 | 0.98395 | 0.97789 |
| 6 | 0.99365 | 0.98403 | 0.97566 |

(3) Design for the Basic Flow Channel Structure
  combined with the structural form of the inner flow channel and the process characteristics of additive manufacturing, when printing the structural features of the inner flow channel with a diameter of $\Phi \leq 8$ mm, the process state is stable, the forming quality of the inner surface of the flow channel is good, and the flow channel structure can be freely formed in space. When printing a flow channel with a diameter of $\Phi \geq 8$ mm, the structural forms of flow channels process such as oval and water droplets are typically used to meet the printing process requirements under the condition that the cross-sectional area of the flow channel is constant (the flow rate is constant); meanwhile, when there is a one-way flow channel with a diameter of $\Phi \geq 8$ mm in the inlet or outlet section of the flow channel, the flow channel can also be processed in the machining process of the later parts in combination with the traditional machining process (Note: different materials have different process requirements, and the parameters proposed in this paper are only for aluminum alloy materials).

S4, the optimization design for an outer envelope structure is performed on the basis of the flow channel structure;
  the topology optimization is performed on the external structure of the fuel control device after determining a mounting fulcrum position of the fuel control device, and the specific steps are as follows:
  step 1, a design domain range of the fuel control device is preliminarily designed in the computer-aided design (CAD) modeling software, a mounting hole position of the mounting fulcrum is segmented in the Altair Inspire software, and the design domain is set at the same time;
  step 2, a fixed constraint condition is applied at the fulcrum position of the fuel control device, a pressure load is applied on an inner surface of the flow channel and the pipeline, and at the same time an overload load is applied on the X axis, the Y axis and the Z axis respectively;
  step 3, a quality target and a grid size parameter are set, and a topological calculation is performed on a material distribution of the material in the structural design domain of the fuel control device;
  step 4, according to a topological calculation result, a reconstruction design is performed on a structure of a mounting fulcrum region of the fuel control device.

S5, the finite element tool is used to check the structure and optimize the iterative design of the fuel control device structure, the fuel control device determines the structural scheme of the optimal fuel control device through the static strength check and random vibration check. The results of the structural scheme of the final fuel control device are shown in Table 3:

Table 3 Comparison between the original shell and the optimized final fuel control device

| | Weight (kg) | Number of flow channels (pieces) |
|---|---|---|
| Original shell | 12.43 | 175 |
| Optimized final fuel control device | 7.71 | 82 |

It can be seen from the data in Table 3 that the final fuel control device structure used optimization scheme weighs 7.71 kg, which is 38% less than the original shell (12.43 kg). The number of flow channels in the optimization scheme is 82, which is half of the number of traditional machining flow channels (the number of traditional machining flow channels is 175).

Therefore, the present invention adopts the above optimization method for fuel control device structure based on additive manufacturing, combines the process advantages of additive manufacturing, overcomes the defects of traditional design thinking of valve parts, and determines the optimal structure arrangement and flow channel design scheme that meet the product requirements through forward design ideas, the outer envelope structure of the fuel control device is further optimized and iterated through tools such as topology, so as to achieve the performance and lightweight benefits that meet the technical requirements. Meanwhile, the product sample can be quickly iterated through additive manufacturing technology, which can effectively shorten the development cycle of the product.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:
1. An optimization method for a fuel control device structure based on additive manufacturing, comprising the following steps:
  S1, performing, by a computer, a basic arrangement analysis and a selection of a fuel control device, and determining different basic configuration structures according to different arrangements of a main core of the fuel control device;
  wherein the fuel control device further comprises: a fluid inlet, three metering valves, a shape-following bifurcated flow channel, three actuating valves, three outlet pipe fittings, single-connected flow channels and bifurcated flow channels;
  and wherein the basic configuration structure comprises an L-shaped main core basic configuration and a T-shaped main core basic configuration; in the L-shaped main core basic configuration, fluid flows into the three metering valves according to different flow rates through the shape-following bifurcated flow channel, the three metering valves are a fan-shaped distribution, the three actuating valves and the three outlet pipe fittings are axially parallel, and a side of the main core is in a L-shaped configuration; and in the T-shaped main core basic configuration, the fluid is distributed axially into the three metering valves through the fluid inlet, the three metering valves are respectively provided with the three actuating valves perpendicular to the three metering valves, the fluid flows out through the three outlet pipe fittings axially parallel to the three metering valves, and a side of the main core is in a side-standing T-shaped configuration;

S2, performing, by the computer, an arrangement design of a basic component/interface feature structure of the fuel control device according to a basic configuration structure, and determining a basic arrangement principle of a module;

S3, performing, by the computer, an optimization design for a flow channel structure on the basis of determining structural features of all cores, components, and interfaces; performing a structural optimization design of the single-connected flow channels and the bifurcated flow channels by changing a size of an inlet cross-section of the single-connected flow channels and a size of an outlet cross-section of the bifurcated flow channels;

S4, performing, by the computer, an optimization design for an outer envelope structure of the fuel control device on the basis of the determined flow channel structure; and S5, performing a checking calculation by the computer and performing an optimized iterative design of the fuel control device through a finite element tool, and determining an optimal structural scheme of the fuel control device; and manufacturing the fuel control device according to the optimal structural scheme by utilizing an additive manufacturing process.

2. The optimization method for the fuel control device structure based on additive manufacturing according to claim 1, wherein in step S2, the basic arrangement principle comprises a preferred arrangement principle for cable-mounted components, a modular arrangement principle for associated components, an arrangement principle for remaining feature structures in order of size from large to small, and a standardized arrangement principle for fine feature structures.

3. The optimization method for the fuel control device structure based on additive manufacturing according to claim 2, wherein the preferred arrangement principle for cable-mounted components is specified as follows: on the basis of determining a basic configuration structure of the main core, a position of a wire groove structure of the fuel control device is determined by the basic configuration structure of the main core, electro-hydraulic servo valves and pressure sensors of the fuel control device are arranged alternately, and two-by-two groups are distributed according to a shape of a space, and cables and pipelines of the electro-hydraulic servo valves and the pressure sensors are collected into the wire groove structure through a gap between metering valves, and two reheat lit solenoid valves of the fuel control device are distributed vertically and arranged in parallel, and are connected in the wire collecting groove together with two cable interfaces.

4. The optimization method for the fuel control device structure based on additive manufacturing according to claim 2, wherein the modular arrangement principle for associated components comprises that a reheat lit valve, a layer board, and electro-hydraulic servo valves of the fuel control device are associated components to form a modular structure distribution, and an actuating valve, a differential pressure valve, and an oil nozzle component of the fuel control device form an other modular structure distribution.

5. The optimization method for the fuel control device structure based on additive manufacturing according to claim 2, wherein the arrangement principle for remaining feature structures in order of size from large to small is that an oil leakage box, a vortex oil filter, a valve, a pipe fitting, an oil nozzle, and measuring point plug screws of the fuel control device are arranged in order of size.

6. The optimization method for the fuel control device structure based on additive manufacturing according to claim 2, wherein the standardized arrangement principle for fine feature structures is that structural features of screw holes of the fuel control device are arranged according to a same height and a same angle, and structural features of measuring point plug screws of the fuel control device and a structural arrangement of reheat lit solenoid valves of the fuel control device are designed regularly.

7. The optimization method for the fuel control device structure based on additive manufacturing according to claim 1, wherein in S4, a topology optimization is performed on an external structure of the fuel control device after determining a mounting fulcrum position of the fuel control device by the following steps:

step 1, preliminarily designing a design domain range of the fuel control device in a computer-aided design (CAD) modeling software, segmenting a mounting hole position of a mounting fulcrum of the fuel control device in an Altair Inspire software, and setting a design domain;

step 2, applying a fixed constraint condition at mounting fulcrum position of the fuel control device, applying a pressure load on an inner surface of a flow channel and a pipeline of the fuel control device, and applying an overload load on an X axis, a Y axis and a Z axis respectively;

step 3, setting a quality target and a grid size parameter, and performing a topological calculation on a material distribution of a material in the design domain of the fuel control device; and step 4, according to a topological calculation result, performing a reconstruction design on a structure of a mounting fulcrum region of the fuel control device.

* * * * *